Nov. 8, 1927.  
J. J. STEIGER  
SPRAYING MACHINE  
Filed Aug. 28, 1925
1,648,154
2 Sheets-Sheet 1
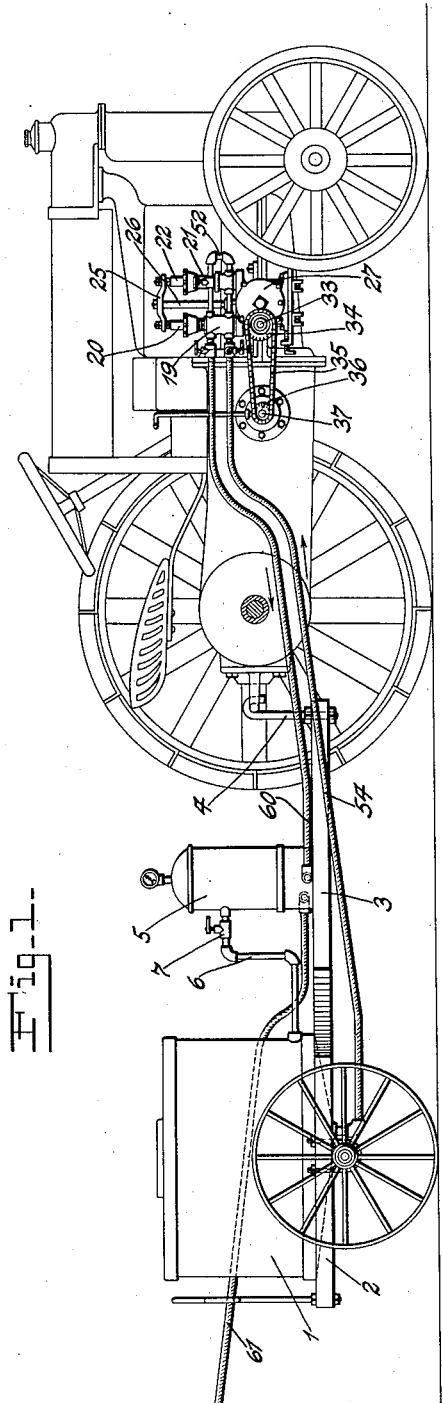
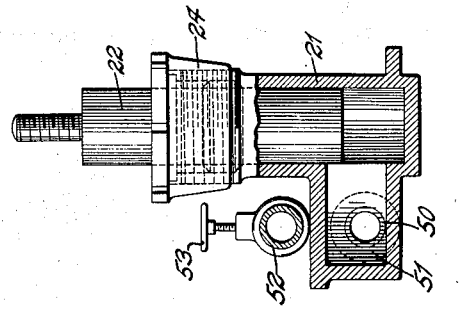
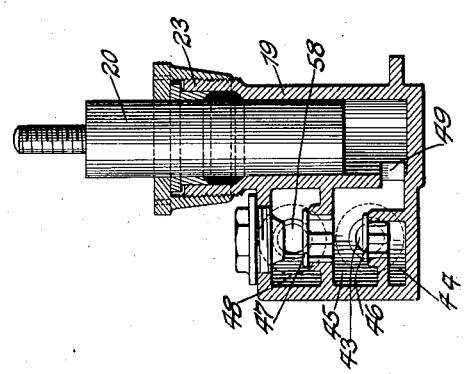
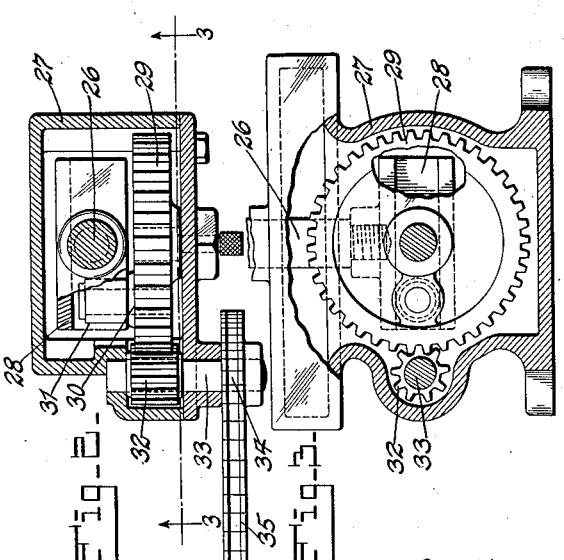
Inventor:
Jacob J. Steiger,
by Rippey Kingsland,
His Attorneys.

Nov. 8, 1927.
J. J. STEIGER
1,648,154
SPRAYING MACHINE
Filed Aug. 28, 1925 2 Sheets-Sheet 2
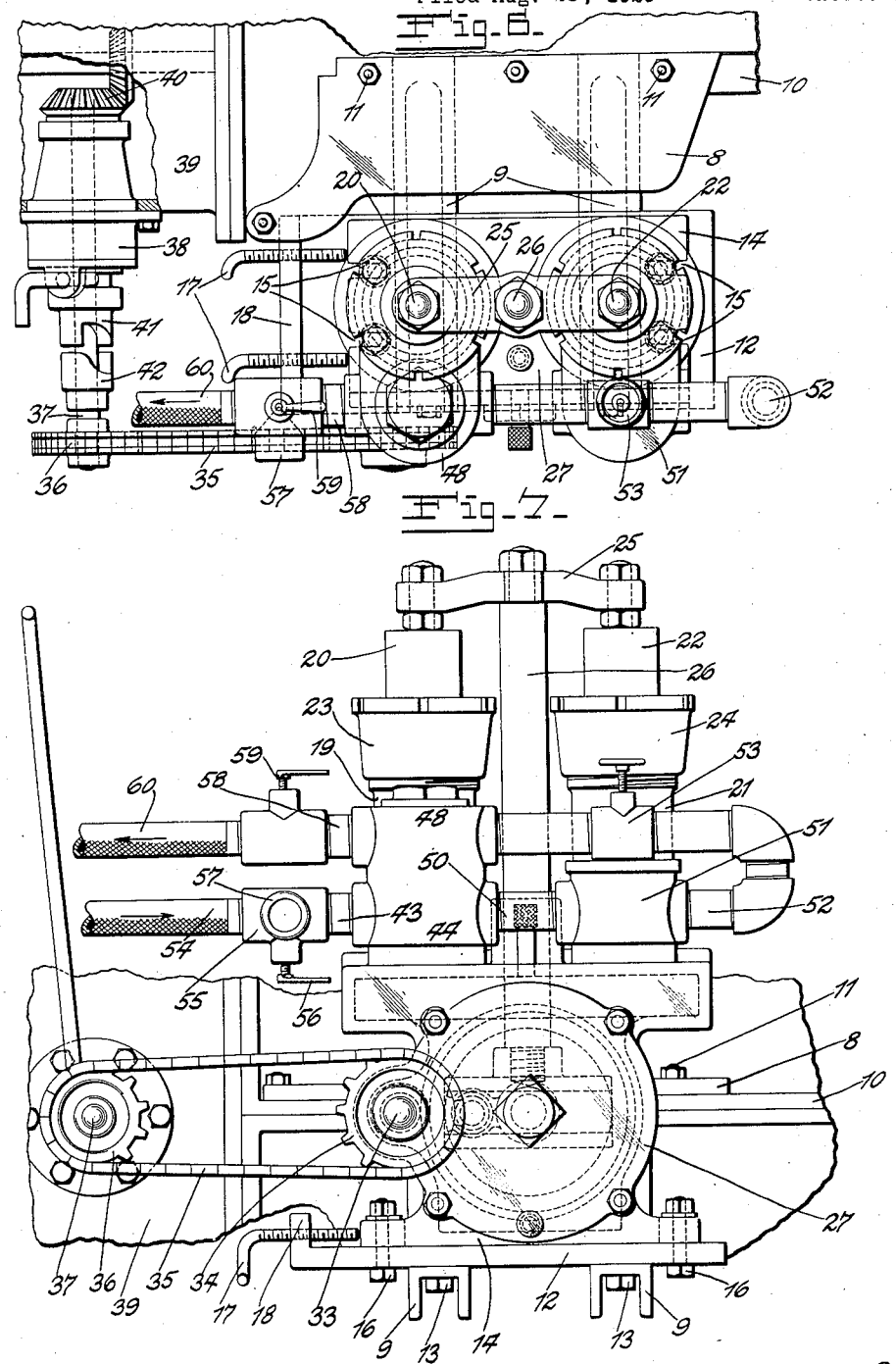
Inventor:
Jacob J. Steiger,
By Rippey Kingsland,
His Attorneys.

Patented Nov. 8, 1927.

1,648,154

UNITED STATES PATENT OFFICE.

JACOB J. STEIGER, OF OVERLAND, MISSOURI.

SPRAYING MACHINE.

Application filed August 28, 1925. Serial No. 53,042.

This invention relates to spraying machines.

An object of the invention is to provide a spraying machine for use in spraying trees, shrubbery and the like, designed and adapted for operation by the engine of a motor vehicle and embodying the new mechanism herein disclosed for obtaining the advantages made apparent by the following specification.

Another object of the invention is to provide a spraying apparatus comprising a receptacle for the substance used in spraying, pump mechanism designed and adapted to be attached to the frame of a tractor, means for driving the pump mechanism by the power of the tractor, and means connected with the pump mechanism for withdrawing the substance used in spraying from the receptacle and discharging the same under sufficient pressure to spray shrubbery or trees.

Another object of the invention is to provide an improved pump mechanism designed and adapted for use in connection with the spraying apparatus and with a tractor to obtain the beneficial results hereinafter disclosed.

Another object of the invention is to provide an improved pump mechanism and means for operating the same by the power of a tractor engine to serve as a pump for withdrawing water from wells or other source of water supply.

Other objects will appear from the following description, reference being made to the accompanying drawings, in which Fig. 1 is a side elevation of the invention in connection with a tractor.

Fig. 2 is a cross sectional view showing the driving mechanism for the pump pistons.

Fig. 3 is a sectional view on the line 3—3 of Fig. 2.

Fig. 4 is a vertical sectional view of one of the pump cylinders and the valve controlled inlet and outlet passages in connection therewith.

Fig. 5 is a sectional view of another pump cylinder.

Fig. 6 is a plan view of the pump mechanism and the driving devices therefor.

Fig. 7 is an enlarged side elevation of the pump mechanism.

The mixture or substance used for spraying is contained in the tank 1 mounted on a wheeled truck 2 having a tongue 3 provided with means 4 for engagement with the rear end of a tractor frame, so that the entire spraying device may be drawn from place to place by the tractor. The truck also supports a pressure tank 5 into and from which the spraying mixture or substance is forced by the pump mechanism. A pipe 6 forms communication from the pressure tank 5 to the lower part of the tank 1 and is controlled by a valve 7 which may open and close said communication.

The pump mechanism is supported on a frame consisting of a plate 8 and downwardly and outwardly extending arms 9. The plate 8 is secured to the tractor frame 10 by bolts 11. A stationary plate 12 is attached to the horizontal outwardly extended portions of the arms 9 by bolts 13.

The pump frame 14 has a pair of longitudinal slots 15 in each end, and seats upon the plate 12 being retained thereon by bolts 16 passing through the plate 12 and the slots 15. Adjusting screws 17 supported by a flange 8 on one end of the plate 12 are operative to force the pump mechanism to proper position on the plate 12 to hold the driving connections for the pump under proper tension.

The pump comprises a cylinder 19 for a piston 20 and a cylinder 21 for a cooperative piston 22. The pistons 20 and 22 operate through the heads 23 and 24 of the pistons 19 and 21, respectively, and are rigidly connected at their upper ends by a cross head 25.

An operating connection for the pistons comprises a rod 26 having its upper end rigidly attached to the cross head 25. The rod 26 extends downwardly between the cylinders 19 and 21 into a housing 27 (Figs. 2 and 3) and has a channel block 28 rigid with its lower end. A gear wheel 29 is journaled for rotation in the housing 27 and has an arm 30 extending laterally therefrom and supporting a roller 31 in the channel of the block 28, so that when the gear 29 is rotated continuously in one direction the pistons will be reciprocated. A pinion 32 meshes with the gear 29 and is attached to the inner ends of a shaft 33 journaled in the housing walls and supporting a sprocket wheel 34 on its outer end connected by a chain 35 with a sprocket wheel 36 loose on the outer end of a horizontal shaft 37. The shaft 37 is journaled in a bearing 38 removably attached to the casing 39 of the tractor transmission shaft. A pinion 40 (Fig. 6)

rigid with the inner end of the shaft 37 is driven constantly by the gearing on the transmission shaft of the tractor when the engine is running, whether the tractor is stationary or not. A clutch member 41 is slidable on the shaft 37 into and out of engagement with a clutch member 42 rigid with the sprocket wheel 36 so that the pump connections may be optionally operated from the engine of a tractor.

A pipe connection 43, (Figs. 4 and 7) opens in part into a chamber 44 and in part into a chamber 45. An opening through the wall between said chambers is controlled by a valve 46. In its raised position the upper end of the valve 46 is against the lower end of a valve 47 controlling an opening from the chamber 45 to a chamber 48. There is an opening 49 from the chamber 45 to the lower end of the cylinder 19. On the upstroke of the pistons the valve 46 is raised and on the down stroke the valve is closed, permitting part of the spraying solution to be forced back into the tank 1 to keep the spraying solution agitated. A pipe 50 (Figs. 6 and 7) constitutes a passage from the chamber 49 to a chamber 51 opening into the lower end of the piston 21 and from which a pipe 52 constitutes a passage to the chamber 48. The pipe 52 may be opened or closed by a valve 53.

A pipe or hose 54 forms a passage from the lower end of the tank 1 to a valve chamber 55 in connection with the pipe 43, and is equipped with a three-way valve device 56 of known construction and operation. A lateral hose or pipe connection 57 is provided on the valve chamber 55 so that the valve 56 may be adjusted to open communication from the pipe 54 to the pump mechanism, and close communication from the inlet 57 to the pump mechanism, and vice versa. Thus by attaching a pipe or hose to the connection 57 and opening the valve thereto, which at the same time closes the pipe 54, the apparatus may be used as a pump to draw water from a well or other source of supply. And, by adjusting the valve 56 to close the inlet 57, the pipe 54 may be opened to draw the contents from the tank 1.

A pipe 58 opens from the chamber 48 and is equipped with a valve 59 to open and to close communication therethrough. A pipe or hose 60 leads from the valve 59 to the pressure tank 5 with which a hose 61 is connected to direct the spray, as desired.

From the foregoing it will be seen that my invention is a highly efficient and simplified mechanism which may be easily attached to a farm tractor and moved from place to place and operated thereby. The device is capable of obtaining the desired pressure to force the spray upon the tops of high trees, or the pressure may be reduced by adjustment of the valve 7. The invention is capable of wide variation without departure from the nature and principle thereof, and I do not restrict myself in any unessential particulars but what I claim and desire to secure by Letters Patent is:—

1. A spraying machine comprising a frame, a drive shaft mounted in said frame, a supporting frame, means releasably holding the supporting frame on one of the lateral sides of said first frame, a pump frame mounted on the upper side of said supporting frame at the lateral side of said first frame, a pump in said pump frame, a shaft supported by said first frame and geared to said drive shaft, devices in said pump frame for operating said pump, and connections driven by said second shaft for operating said devices.

2. A spraying machine comprising a frame, a drive shaft mounted in said frame, a pump frame, means releasably supporting said pump frame at one of the lateral sides of said first frame, a pump in said pump frame, a shaft rotatively supported by said first frame and extending laterally adjacent to said drive shaft to a point outside of said first frame, devices in said pump frame for operating said pump, means for rotating said second shaft constantly when said drive shaft rotates, and means for operating said operating devices by said second shaft.

3. In a machine of the character described a supporting frame, a pump frame mounted on said supporting frame, pump mechanism supported by said pump frame, a rod for operating said pump mechanism and extending into said frame, a gear wheel mounted in said pump frame, an arm supported by said gear wheel, means for operating said rod by said arm when said gear wheel is rotated, a shaft rotatively supported by said pump frame, a pinion on said shaft meshing with said gear wheel, and means for rotating said shaft.

JACOB J. STEIGER.